United States Patent
Tanaka et al.

(10) Patent No.: US 10,874,910 B2
(45) Date of Patent: *Dec. 29, 2020

(54) GOLF BALL

(71) Applicant: SUMITOMO RUBBER INDUSTRIES, LTD., Kobe (JP)

(72) Inventors: Mami Tanaka, Kobe (JP); Toshiyuki Tarao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 6 days.

This patent is subject to a terminal disclaimer.

(21) Appl. No.: 16/435,161

(22) Filed: Jun. 7, 2019

(65) Prior Publication Data

US 2019/0282860 A1 Sep. 19, 2019

Related U.S. Application Data

(63) Continuation-in-part of application No. 15/854,092, filed on Dec. 26, 2017, now Pat. No. 10,363,459.

(30) Foreign Application Priority Data

Dec. 27, 2016 (JP) .................................. 2016-253567

(51) Int. Cl.
*A63B 37/12* (2006.01)
*C08L 23/08* (2006.01)
*A63B 37/00* (2006.01)

(52) U.S. Cl.
CPC ...... *A63B 37/0024* (2013.01); *A63B 37/0031* (2013.01); *A63B 37/0039* (2013.01); *A63B 37/0043* (2013.01); *A63B 37/0062* (2013.01); *A63B 37/0065* (2013.01); *A63B 37/0075* (2013.01); *A63B 37/0083* (2013.01); *A63B 37/0092* (2013.01); *C08L 23/0876* (2013.01)

(58) Field of Classification Search
None
See application file for complete search history.

(56) References Cited

U.S. PATENT DOCUMENTS

| | | | |
|---|---|---|---|
| 10,363,459 B2 * | 7/2019 | Tanaka | A63B 37/0065 |
| 2011/0098131 A1 | 4/2011 | Kasashima et al. | |
| 2015/0005103 A1 | 1/2015 | Shigemitsu | |
| 2016/0136484 A1 | 5/2016 | Inoue et al. | |
| 2017/0198138 A1 * | 7/2017 | Nishioka | C08L 67/04 |
| 2018/0178080 A1 * | 6/2018 | Tanaka | A63B 37/0074 |

FOREIGN PATENT DOCUMENTS

JP 2011-92708 A 5/2011

OTHER PUBLICATIONS

SeRM Super Polymer User's Guide; Advanced Polymer Materials (2011) pp. 1-4. (Year: 2011).*

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent shot feeling and resilience as well as improved durability and abrasion resistance. The present invention provides a golf ball comprising a spherical core and one or more cover layers disposed outside the spherical core, wherein at least one layer of the cover layers contains: (A) a base resin containing (a-1) an ionomer resin and having a material hardness of 58 or less in Shore D hardness; and (B) a polyrotaxane having a cyclodextrin with at least a part of hydroxyl groups thereof being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin.

17 Claims, 2 Drawing Sheets

GOLF BALL

CROSS-REFERENCE TO RELATED APPLICATIONS

This application is a Continuation-in-Part of U.S. application Ser. No. 15/854,092 (now U.S. Pat. No. 10,363,459, issued on Jul. 30, 2019), filed on Dec. 26, 2017, which claims priority under 35 U.S.C. § 119(a) to Application No. 2016-253567, filed in Japan on Dec. 27, 2016, all of which are hereby expressly incorporated by reference into the present application.

FIELD OF THE INVENTION

The present invention relates to a technology for improving a cover of a golf ball.

DESCRIPTION OF THE RELATED ART

As a resin component constituting a cover or intermediate layer of a golf ball, a thermoplastic resin such as an ionomer resin or a polyurethane is used. The ionomer resin is highly rigid, and when used as a constituent member of a golf ball, the resultant golf ball is highly resilient and travels a great flight distance. Thus, the ionomer resin is widely used as a material of an intermediate layer or cover constituting a golf ball.

For a golf ball, not only the flight performance, but also various performances such as the durability, abrasion resistance and shot feeling are also desired. For example, as an invention aiming to provide a golf ball striking a good balance between the durability and the flight performance, Japanese Patent Publication No. 2011-92708 A discloses a golf ball comprising a core, at least one intermediate layer and a cover, wherein the intermediate layer is formed primarily of a highly neutralized ionomer resin composition having an increased neutralization degree and obtained by adding a basic inorganic metal compound or the like in a conventional ionomer resin, and the cover is formed primarily of a mixture comprising an ionomer resin an a granular inorganic filler (refer to claim 1 and paragraphs 0010-0012 in Japanese Patent Publication No. 2011-92708 A).

SUMMARY OF THE INVENTION

Examples of the method for improving the shot feeling of a golf ball include a method of lowering the material hardness of the cover to obtain a softer shot feeling. However, although the cover containing a ternary ionomer resin has a low material hardness, the golf ball exhibits lowered resilience. In addition, although the cover containing a thermoplastic styrene elastomer has a low material hardness and the golf ball does not exhibit lowered resilience, the golf ball exhibits worsened durability and abrasion resistance. Thus, if the material hardness of the cover is lowered to improve the shot feeling of the golf ball, there is a problem that the resilience or the durability and abrasion resistance of the golf ball is worsened.

The present invention has been made in view of the above mentioned circumstances, and an object of the present invention is to provide a golf ball having excellent shot feeling and resilience as well as improved durability and abrasion resistance.

The present invention that has solved the above problems provides a golf ball comprising a spherical core and one or more cover layers disposed outside the spherical core, wherein at least one layer of the cover layers contains: (A) a base resin containing (a-1) an ionomer resin and having a material hardness of 58 or less in Shore D hardness; and (B) a polyrotaxane having a cyclodextrin with at least a part of hydroxyl groups of the cyclodextrin being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin.

The present invention also provides a golf ball comprising a spherical core and one or more cover layers disposed outside the spherical core, wherein at least one layer of the cover layers contains: (A) a base resin having a material hardness of 58 or less in Shore D hardness and containing (a-1) an ionomer resin and (a-2) a non-ionomer resin in a mass ratio ((a-2)/(a-1)) of (a-2) the non-ionomer resin to (a-1) the ionomer resin ranging from 1/99 to 50/50; and (B) a polyrotaxane having a cyclodextrin with at least a part of hydroxyl groups of the cyclodextrin being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin, and wherein the cover layer containing (A) the base resin and (B) the polyrotaxane contains (B) the polyrotaxane in an amount of from 0.1 part by mass to 20 parts by mass with respect to 100 parts by mass of (A) the base resin.

According to the present invention, a golf ball having excellent shot feeling and resilience as well as improved durability and abrasion resistance can be provided.

DESCRIPTION OF THE PREFERRED EMBODIMENT

Figure 1:
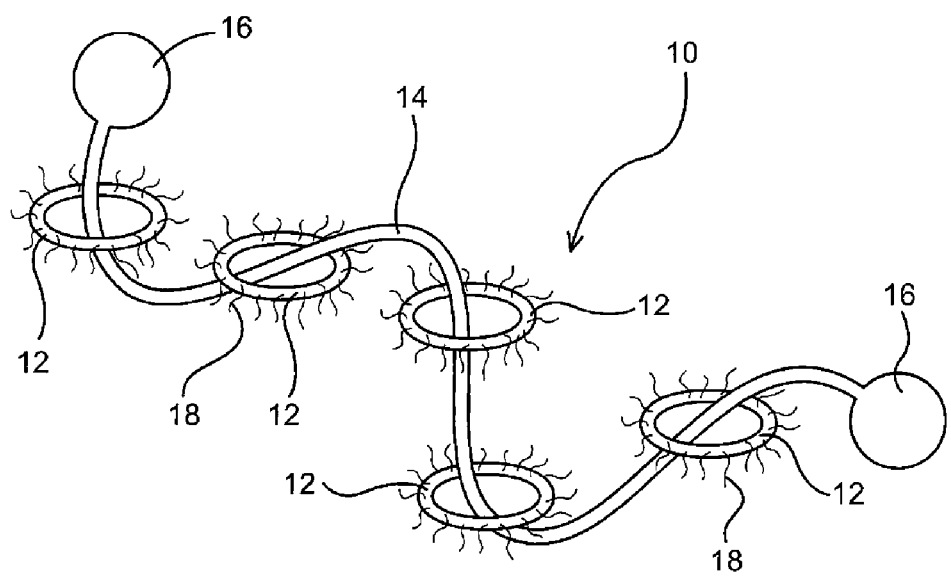
FIG. 1 is an illustrative drawing illustrating a molecular structure of one example of the polyrotaxane used in the present invention.

The present invention provides a golf ball comprising a spherical core and one or more cover layers disposed outside the spherical core, wherein at least one layer of the cover layers contains: (A) a base resin containing (a-1) an ionomer resin and having a material hardness of 58 or less in Shore D hardness; and (B) a polyrotaxane having a cyclodextrin with at least a part of hydroxyl groups of the cyclodextrin being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin. It is noted that an outermost layer of the cover layers is an outermost layer of a golf ball body (excluding a paint film).

At least one layer of the cover layers of the golf ball according to the present invention is preferably formed from a cover composition containing (A) the base resin and (B) the polyrotaxane as a resin component. First, (A) the base resin used in the cover layer of the golf ball according to the present invention will be explained.

[(A) Base Resin]

(A) The base resin contains (a-1) the ionomer resin as an essential component. Examples of (a-1) the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

It is noted that, in the present invention, "an ionomer resin consisting of a metal ion-neutralized product of a binary copolymer composed of an olefin and an α,β-unsaturated carboxylic acid having 3 to 8 carbon atoms" is sometimes simply referred to as "a binary ionomer resin", and "an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "a ternary ionomer resin".

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

As the binary ionomer resin, a metal ion-neutralized product of an ethylene-(meth)acrylic acid binary copolymer is preferable. As the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary ionomer resin is preferably 5 mass % or more, more preferably 10 mass % or more, even more preferably 16 mass % or more, and most preferably 17 mass % or more, and is preferably 30 mass % or less, more preferably 25 mass % or less. This is because if the amount of the α,β-unsaturated carboxylic acid component having 3 to 8 carbon atoms is 5 mass % or more, the constituent member having a desirable hardness is easily obtained, and if the amount of the α,β-unsaturated carboxylic acid component having 3 to 8 carbon atoms is 30 mass % or less, the hardness of the obtained constituent member is not too high and thus the durability and the shot feeling of the golf ball are better.

The neutralization degree of the carboxyl groups of the binary ionomer resin is preferably 15 mole % or more, more preferably 20 mole % or more, and is preferably 90 mole % or less, more preferably 85 mole % or less. If the neutralization degree is 15 mole % or more, the obtained golf ball has better resilience and durability, and if the neutralization degree is 90 mole % or less, the cover material has better fluidity (better moldability). It is noted that the neutralization degree of the carboxyl groups of the binary ionomer resin may be calculated by the following expression.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of the binary ionomer resin include monovalent metal ions such as sodium, potassium and lithium; divalent metals ions such as magnesium, calcium, zinc, barium and cadmium; trivalent metals ions such as aluminum; and other ions such as tin and zirconium. As the binary ionomer resin, a mixture consisting of a sodium-neutralized binary ionomer resin and a zinc-neutralized binary ionomer resin is preferably used. Using the mixture further enhances the resilience and the durability.

Specific examples of the binary ionomer resin include trade names of "Himilan (registered trademark) (e.g. Himilan 1555 (Na), Himilan 1557 (Zn), Himilan 1605 (Na), Himilan 1702 (Zn), Himilan 1706 (Zn), Himilan 1707 (Na), Himilan AM7311 (Mg), Himilan AM7329 (Zn), Himilan AM7337 (Na))" available from Mitsui-Du Pont Polychemicals Co., Ltd.

Specific examples of the binary ionomer resin further include trade names of "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E.I. du Pont de Nemours and Company.

Specific examples of the binary ionomer resin further include trade names of "Iotek (registered trademark) (e.g. Iotek 8000 (Na), Iotek 8030 (Na), Iotek 7010 (Zn), Iotek 7030 (Zn))" available from ExxonMobil Chemical Corporation.

The above listed binary ionomer resin may be used solely, or at least two of them may be used in combination. It is noted that Na, Zn, Li, Mg and the like described in the parentheses after the trade names indicate metal types of neutralizing metal ions of the binary ionomer resins.

The bending stiffness of the binary ionomer resin is preferably 140 MPa or more, more preferably 150 MPa or more, and even more preferably 160 MPa or more, and is preferably 550 MPa or less, more preferably 500 MPa or less, and even more preferably 450 MPa or less. If the bending stiffness falls within the above range, the spin rate on driver shots is optimized and thus the flight performance is excellent, and the durability is also better.

The melt flow rate (190° C., 2.16 kgf) of the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the melt flow rate (190° C., 2.16 kgf) of the binary ionomer resin is 0.1 g/10 min or more, the cover material has better fluidity, and thus, for example, a thin cover can be obtained. In addition, if the melt flow rate (190° C., 2.16 kgf) of the binary ionomer resin is 30 g/10 min or less, the obtained golf ball has better durability.

The amount of the α,β-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 90 mole % or less, more preferably 85 mole % or less. If the neutralization degree is 20 mole % or more, the obtained golf ball has better resilience and durability, and if the neutralization degree is 90 mole % or less, the cover material has better fluidity (better moldability). It is noted that the neutralization degree of the carboxyl groups of the ionomer resin may be calculated by the following expression.

Neutralization degree of ionomer resin (mole %)=100×(mole number of neutralized carboxyl groups in ionomer resin/mole number of all carboxyl groups in ionomer resin)

Examples of the metal ion for neutralizing at least a part of carboxyl groups of the ternary ionomer resin include monovalent metal ions such as sodium, potassium and lithium; divalent metals ions such as magnesium, calcium, zinc, barium and cadmium; trivalent metals ions such as aluminum; and other ions such as tin and zirconium.

Specific examples of the ternary ionomer resin include trade names of "Himilan (registered trademark) (e.g. Himilan AM7327 (Zn), Himilan 1855 (Zn), Himilan 1856 (Na), Himilan AM7331 (Na))" available from Mitsui-Du Pont Polychemicals Co., Ltd.; trade names of "Surlyn 6320 (Mg), Surlyn 8120 (Na), Surlyn 8320 (Na), Surlyn 9320 (Zn), Surlyn 9320W (Zn))" available from E.I. du Pont de Nemours and Company; and trade names of "lotek 7510 (Zn), lotek 7520 (Zn))" available from ExxonMobil Chemical Corporation. It is noted that Na, Zn, Mg and the like described in the parentheses after the trade names indicate metal types of neutralizing metal ions of the ternary ionomer resins. The ternary ionomer resin may be used solely, or at least two of them may be used in combination.

The bending stiffness of the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the bending stiffness falls within the above range, the spin rate on driver shots is optimized and thus the flight performance is excellent, and the durability is also better.

The melt flow rate (190° C., 2.16 kgf) of the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the melt flow rate (190° C., 2.16 kgf) of the ternary ionomer resin is 0.1 g/10 min or more, the cover material has better fluidity, and thus, for example, a thin constituent member can be obtained. In addition, if the melt flow rate (190° C., 2.16 kgf) of the ternary ionomer resin is 20 g/10 min or less, the obtained golf ball has better durability.

The amount of (a-1) the ionomer resin in (A) the resin component is preferably 50 mass % or more, more preferably 60 mass % or more, and even more preferably 70 mass % or more. This is because if the amount of (a-1) the ionomer resin is 50 mass % or more, lowering in the resilience of the obtained golf ball can be suppressed. The upper limit of the above amount is preferably 100 mass %, without any limitation.

The material hardness of (a-1) the ionomer resin used in the present invention is preferably 40 or more, more preferably 43 or more, and even more preferably 45 or more in Shore D hardness, and is preferably 65 or less, more preferably 62 or less, and even more preferably 58 or less in Shore D hardness. This is because if the material hardness is 40 or more in Shore D hardness, the obtained golf ball has further enhanced resilience, and if the material hardness is 65 or less in Shore D hardness, the obtained golf ball has further enhanced durability. (a-1) The ionomer resin used in the present invention may be prepared by neutralizing a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester with a metal compound when molding the cover.

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

Specific examples of the binary copolymer include an ethylene-methacrylic acid copolymer having a trade name of "NUCREL (registered trademark) (e.g. "NUCREL N1050H", "NUCREL N2050H", "NUCREL N1110H", "NUCREL NO200H")" available from Mitsui-Du Pont Polychemicals Co., Ltd.; and an ethylene-acrylic acid copolymer having a trade name of "PRIMACOR (registered trademark) 59801" available from Dow Chemical Company.

Specific examples of the ternary copolymer include trade names of "NUCREL (registered trademark) (e.g. "NUCREL AN4318", "NUCREL AN4319")" available from Mitsui-Du Pont Polychemicals Co., Ltd.; trade names of "NUCREL (registered trademark) (e.g. "NUCREL AE")" available from E.I. du Pont de Nemours and Company; and trade names of "PRIMACOR (registered trademark) (e.g. "PRIMACOR AT310", "PRIMACOR AT320")" available from Dow Chemical Company. The binary copolymer or ternary copolymer may be used solely, or at least two of them may be used in combination.

Examples of the metal compound for neutralizing the carboxyl groups of the binary copolymer and/or the ternary copolymer include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

(A) The base resin may further contain a resin component (hereinafter, sometimes referred to as "(a-2) a non-ionomer resin") other than the ionomer resin. Examples of (a-2) the non-ionomer resin include a thermoplastic resin such as polyamide and polyolefin; a thermoplastic elastomer such as styrene elastomer, polyolefin elastomer, polyamide elastomer and polyester elastomer; a binary copolymer composed of an olefin and an α,β-unsaturated carboxylic acid having 3 to 8 carbon atoms such as ethylene-(meth)acrylic acid copolymer; and a ternary copolymer composed of an olefin, an α,β-unsaturated carboxylic acid having 3 to 8 carbon atoms and an α,β-unsaturated carboxylic acid ester such as ethylene-(meth)acrylic acid-(meth)acrylic acid ester copolymer. (a-2) The non-ionomer resin may be used solely, or at least two of them may be used in combination. In addition, (A) the base resin may consist of (a-1) the ionomer resin.

(a-2) The non-ionomer resin is preferably at least one member selected from the group consisting of polyamide, styrene elastomer, polyolefin elastomer, polyamide elastomer, polyester elastomer, the binary copolymer composed of an olefin and an α,β-unsaturated carboxylic acid having 3 to 8 carbon atoms, and the ternary copolymer composed of an olefin, an α,β-unsaturated carboxylic acid having 3 to 8 carbon atoms and an α,β-unsaturated carboxylic acid ester.

The polyamide is not particularly limited, as long as it is a thermoplastic resin having a plurality of amide bonds (—NH—CO—) in the main chain of the molecule. Examples of the polyamide include a product having amide bonds in the molecule, formed by a ring-opening polymerization reaction of a lactam, or a reaction between a diamine component and a dicarboxylic acid component.

Examples of the polyamide include an aliphatic polyamide such as polyamide 6, polyamide 11, polyamide 12, polyamide 66, polyamide 610, polyamide 6T, polyamide 6I, polyamide 9T, polyamide M5T and polyamide 612; and an aromatic polyamide such as poly-p-phenylene terephthalamide and poly-m-phenylene isophthalamide. These polyamides may be used solely, or two or more of them may be used in combination. Among them, the aliphatic polyamide such as polyamide 6, polyamide 66, polyamide 11, and polyamide 12 is preferred.

Specific examples of the polyamide include trade names of "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, Rilsan BMN P40 D)" available from Arkema Inc.

The polyolefin is not particularly limited, as long as it is a compound synthesized by using one or at least two olefins as a monomer. The olefin is preferably an olefin having 2 to 8 carbon atoms. Examples of the olefin include ethylene, propylene, butene, pentene, hexene, heptene and octane. As the polyolefin, polyethylene and polypropylene are preferable, polyethylene is more preferable.

As the styrene elastomer, a thermoplastic elastomer containing a styrene block is preferably used. The thermoplastic elastomer containing the styrene block includes a polystyrene block as a hard segment, and a soft segment. The typical soft segment is a diene block. Examples of the constituent component of the diene block include butadiene, isoprene, 1,3-pentadiene and 2,3-dimethyl-1,3-butadiene. Among them, butadiene and isoprene are preferred. Two or more constituent components may be used in combination.

Examples of the thermoplastic elastomer containing the styrene block include a styrene-butadiene-styrene block copolymer (SBS), a styrene-isoprene-styrene block copolymer (SIS), a styrene-isoprene-butadiene-styrene blockcopolymer (SIBS), a hydrogenated product of SBS, a hydrogenated product of SIS and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the thermoplastic elastomer containing the styrene block is preferably 10 mass % or more, more preferably 12 mass % or more, and even more preferably 15 mass % or more. From the viewpoint of the shot feeling of the obtained golf ball, the above amount is preferably 50 mass % or less, more preferably 47 mass % or less, and even more preferably 45 mass % or less.

Examples of the thermoplastic elastomer containing the styrene block include an alloy of one member or at least two members selected from the group consisting of SBS, SIS, SIBS, SEBS, SEPS, SEEPS and hydrogenated products thereof with a polyolefin. It is estimated that the olefin component in the alloy contributes to the improvement in compatibility with the ionomer resin. If the alloy is used, the resilience performance of the golf ball is enhanced. An olefin having 2 to 10 carbon atoms is preferably used. Suitable olefins include ethylene, propylene, butane and pentene. Ethylene and propylene are particularly preferred.

Specific examples of the alloy include "Rabalon (registered trademark) T3221C", "Rabalon T33390", "Rabalon SJ4400N", "Rabalon SJ5400N", "Rabalon SJ6400N", "Rabalon SJ7400N", "Rabalon SJ8400N", "Rabalon SJ9400N" and "Rabalon SR04" available from Mitsubishi Chemical Corporation. Specific examples of the other thermoplastic elastomer containing the styrene block include "Epofriend A1010" available from Daicel Chemical Industries, Ltd., and "Septon HG-252" available from Kuraray Co., Ltd.

As the polyolefin elastomer, a polyolefin elastomer containing ethylene as a constituent component is preferable. Examples of the thermoplastic polyolefin elastomer containing a functional group include ethylene-glycidyl (meth)acrylate copolymer, ethylene-(meth)acrylic acid ester-glycidyl (meth)acrylate copolymer, ethylene-glycidyl (meth)acrylate-vinyl acetate copolymer.

The polyamide elastomer has a hard segment derived from a polyamide component, and a soft segment. Examples of the component constituting the soft segment of the polyamide elastomer include a polyether ester component and a polyether component. Examples of the polyamide elastomer include a polyether ester amide obtained by a reaction between a polyamide component (hard segment component) and a polyether ester component (soft segment component) which is formed from a polyoxyalkylene glycol and a dicarboxylic acid; and a polyether amide obtained by a reaction between a polyamide component (hard segment component) and a polyether component (soft segment component) which is formed from a dicarboxylic acid or diamine and a compound obtained by aminating or carboxylating both terminals of a polyoxyalkylene glycol.

Examples of the polyamide elastomer include "Pebax 2533", "Pebax 3533", "Pebax 4033", "Pebax 5533" available from Arkema K. K.

Examples of the polyester elastomer include a block copolymer having a hard segment derived from a polyester component, and a soft segment. Examples of the polyester component constituting the hard segment include an aromatic polyester. Examples of the component constituting the soft segment include an aliphatic polyether and an aliphatic polyester.

Specific examples of the polyester elastomer include "Hytrel 3548", "Hytrel 4047" available from Du Pont-Toray Co., Ltd., and "Primalloy A1606", "Primalloy B1600", "Primalloy B1700" available from Mitsubishi Chemical Corporation.

Specific examples of the ethylene-(meth)acrylic acid copolymer include an ethylene-methacrylic acid copolymer having a trade name of "NUCREL (registered trademark) (e.g. "NUCREL N1050H", "NUCREL N2050H", "NUCREL N1110H", "NUCREL NO200H")" available from Mitsui-Du Pont Polychemicals Co., Ltd.; and an ethylene-acrylic acid copolymer having a trade name of "PRIMACOR (registered trademark) 59801" available from Dow Chemical Company.

Specific examples of the ethylene-(meth)acrylic acid-(meth)acrylic acid ester copolymer include trade names of "NUCREL (registered trademark) (e.g. "NUCREL AN4318", "NUCREL AN4319")" available from Mitsui-DuPont Polychemicals Co., Ltd.; trade names of "NUCREL (registered trademark) (e.g. "NUCREL AE")" available from E.I. du Pont de Nemours and Company; and trade names of "PRIMACOR (registered trademark) (e.g. "PRIMACOR AT310", "PRIMACOR AT320")" available from Dow Chemical Company).

In the case that (A) the base resin contains (a-2) the non-ionomer resin, the amount of (a-2) the non-ionomer resin in (A) the base resin is preferably 1 mass % or more, more preferably 3 mass % or more, and even more preferably 5 mass % or more, and is preferably 50 mass % or less, more preferably 40 mass % or less, and even more preferably 30 mass % or less. This is because if the amount of (a-2) the non-ionomer resin is 1 mass % or more, the obtained golf ball has better shot feeling, and if the amount of (a-2) the non-ionomer resin is 50 mass % or less, lowering in the durability of the obtained golf ball can be suppressed.

In the case that (A) the base resin contains (a-2) the non-ionomer resin, the mass ratio ((a-2)/(a-1)) of the amount of (a-2) the non-ionomer resin to the amount of (a-1) the ionomer resin in (A) the base resin is preferably 1/99 or more, more preferably 3/97 or more, and even more preferably 5/95 or more, and is preferably 50/50 or less, more preferably 40/60 or less, and even more preferably 30/70 or less.

The material hardness of (A) the base resin used in the present invention is preferably 42 or more, more preferably 45 or more, and even more preferably 48 or more in Shore D hardness, and is preferably 58 or less, more preferably 57 or less, and even more preferably 56 or less in Shore D hardness. If the material hardness of (A) the base resin is 42 or more in Shore D hardness, the obtained golf ball has further enhanced resilience. In addition, if the material hardness of (A) the base resin is 58 or less in Shore D hardness, lowering in the durability due to repeated hitting can be further suppressed. It is noted that the material hardness of the base resin is a slab hardness obtained by measuring a sheet molded from the base resin.

[(B) Polyrotaxane]

Next, (B) the polyrotaxane used in the present invention will be explained. (B) The polyrotaxane has a cyclodextrin, a linear molecule piercing through a cyclic structure of the cyclodextrin, and blocking groups located at both terminals of the linear molecule to prevent disassociation of the cyclodextrin. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and the α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, the polyether is preferable, and polyethylene glycol is particularly preferable. The polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. When the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through preferably ranges from 0.06 to 0.61, more preferably ranges from 0.11 to 0.48, and even more preferably ranges from 0.24 to 0.41, if the maximum number of the cyclodextrins which the linear molecule pierces through is deemed as 1. This is because if the number of the cyclodextrins which the linear molecule pierces through is less than 0.06, the pulley effect may not be exerted, and if the number of the cyclodextrins which the linear molecule pierces through exceeds 0.61, the cyclodextrins are so densely located that the movability of the cyclodextrin may decrease.

As (B) the polyrotaxane having the cyclodextrin used in the present invention, it is preferable that at least a part of hydroxyl groups of the cyclodextrin is modified with a caprolactone chain having a carboxyl group at a terminal of the caprolactone chain. This is because modifying with the caprolactone enhances the flexibility of the cover layer, thereby achieving better shot feeling.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)nH (n is a natural number of from 1 to 100) is linked to the exterior side of the cyclic structure of the cyclodextrin via —O—C$_3$H$_6$—O— group. The n represents the degree of polymerization, and is preferably a natural number of from 1 to 100, more preferably a natural number of from 2 to 70, and even more preferably a natural number of from 3 to 40. At the other end of the caprolactone chain, a hydroxyl group is formed through the ring-opening polymerization. The other terminal of the caprolactone chain may be modified to be a carboxyl group. This modification allows the caprolactone chain to have a carboxyl group at the terminal of the caprolactone chain.

The ratio of the hydroxyl groups modified with the caprolactone chain having a carboxyl group at a terminal of the caprolactone chain to all the hydroxyl groups (100 mole %) included in the cyclodextrin before the modification is preferably 2 mole % or more, more preferably 5 mole % or more, and even more preferably 10 mole % or more, and is preferably 50 mole % or less, more preferably 30 mole % or less, and even more preferably 20 mole % or less. This is because if the ratio of the hydroxyl groups modified with the caprolactone chain having a carboxyl group at a terminal of the caprolactone chain falls within the above range, the compatibility of the polyrotaxane with the ionomer resin is further enhanced.

FIG. 1 is an illustrative drawing illustrating a molecular structure of one example of (B) the polyrotaxane used in the present invention. A polyrotaxane 10 has a cyclodextrin 12, a linear molecule 14 piercing through the cyclic structure of the cyclodextrin 12, and blocking groups 16 located at both terminals of the linear molecule 14 to prevent disassociation of the cyclodextrin 12, and a caprolactone chain having a carboxyl group at a terminal of the caprolactone chain 18 is linked to the exterior side of the cyclic structure of the cyclodextrin 12 via —O—$C_3H_6$—O— group (not shown).

The hydroxyl value of (B) the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and particularly preferably 180 mg KOH/g or less. This is because if the hydroxyl value of (B) the polyrotaxane falls within the above range, the compatibility of (B) the polyrotaxane with the ionomer resin is further enhanced. It is noted that the hydroxyl value may be measured according to JIS K 1557-1, for example, by an acetylation method.

The total molecular weight of (B) the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. This is because if the weight average molecular weight is 30,000 or more, the resultant cover composition has greater elasticity, and if the weight average molecular weight is 3,000,000 or less, the resultant cover composition has greater flexibility and thus the shot feeling is further enhanced. It is noted that the weight average molecular weight may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone include SeRM (registered trademark) super polymer SH3400P, SH2400P and SH1310P available from Advanced Softmaterials Inc.

At least one layer of the cover layers of the golf ball according to the present invention is formed from the cover composition containing (A) the base resin and (B) the polyrotaxane as the resin component. The cover layer containing (A) the base resin and (B) the polyrotaxane contains (B) the polyrotaxane preferably in an amount of 0.1 part by mass or more, more preferably in an amount of 1 part by mass or more, and even more preferably in an amount of 3 parts by mass or more, and preferably in an amount of 20 parts by mass or less, more preferably in an amount of 15 parts by mass or less, and even more preferably in an amount of 13 parts by mass or less, with respect to 100 parts by mass of (A) the base resin. This is because if the amount of (B) the polyrotaxane is 0.1 part by mass or more, the obtained golf ball exhibits further enhanced resilience, and if the amount of (B) the polyrotaxane is 20 parts by mass or less, the mold release property would not be affected when molding the golf ball.

In the case that the golf ball according to the present invention comprises a plurality of cover layers, at least one layer of the cover layers contains (A) the base resin and (B) the polyrotaxane, and the layer not containing (A) the base resin and (B) the polyrotaxane may contain another resin component. Examples of the other resins include a thermoplastic resin such as polyurethane, ionomer resin, polyamide and polyethylene; and a thermoplastic elastomer such as styrene elastomer, polyolefin elastomer, polyurethane elastomer, polyamide elastomer and polyester elastomer.

Specific examples of the other resin include an ionomer resin having a trade name of "Himilan (registered trademark)" available from Mitsui-Du Pont Polychemicals Co., Ltd., a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Rabalon (registered trademark)" or a thermoplastic polyester elastomer having a trade name of "Primalloy" available from Mitsubishi Chemical Corporation.

The total ratio of (A) the base resin and (B) the polyrotaxane to all the resin components in the cover layer containing (A) the base resin and (B) the polyrotaxane is preferably 60 mass % or more, more preferably 70 mass % or more, and even more preferably 80 mass % or more. This is because if the total ratio is 60 mass % or more, the obtained golf ball exhibits further enhanced resilience. The upper limit of the total ratio is preferably 100 mass %, without any limitation.

The cover of the golf ball according to the present invention may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or fluorescent brightener, unless they impair the performance of the cover.

In the present invention, the material hardness of the cover layer containing (A) the base resin and (B) the polyrotaxane is preferably 40 or more, more preferably 42 or more, and even more preferably 45 or more in Shore D hardness, and is preferably 58 or less, more preferably 57 or less, and even more preferably 56 or less in Shore D hardness. This is because if the material hardness is 40 or more in Shore D hardness, lowering in the resilience of the obtained golf ball can be suppressed, and if the material hardness is 58 or less in Shore D hardness, the obtained golf ball has better shot feeling. It is noted that the material hardness of the cover layer containing (A) the base resin and (B) the polyrotaxane is a slab hardness obtained by measuring a sheet molded from the cover composition containing (A) the base resin and (B) the polyrotaxane.

The spherical core of the golf ball according to the present invention is preferably formed from a resin composition or a rubber composition, and more preferably formed from a rubber composition. The spherical core may be formed, for example, by heat pressing a rubber composition (hereinafter, sometimes simply referred to as "core rubber composition") containing a base rubber, a co-crosslinking agent, and a crosslinking initiator.

As the base rubber, particularly preferred is a high cis-polybutadiene having a cis-bond which is beneficial to the resilience in an amount of 40 mass % or more, preferably 70 mass % or more, and more preferably 90 mass % or more. As the co-crosslinking agent, an α,β-unsaturated carboxylic acid having 3 to 8 carbon atoms or a metal salt thereof is preferred, and an acrylic acid metal salt and an methacrylic acid metal salt are more preferred. As the metal constituting the metal salt, zinc, magnesium, calcium, aluminum and sodium are preferred, and zinc is more preferred. The amount of the co-crosslinking agent is preferably 15 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

The core rubber composition may further contain an organic sulfur compound. Examples of the organic sulfur compound include compounds of diphenyl disulfides (e.g. diphenyl disulfides, bis(pentabromophenyl) disulfides), thiophenols and thionaphthols. The amount of the organic sulfur compound is preferably 0.01 part by mass or more, more preferably 0.05 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, any one of an aliphatic carboxylic acid (e.g. caprylic acid) and an aromatic carboxylic acid (e.g. benzoic acid) may be used. The amount of the carboxylic acid and/or the salt thereof is 1 part by mass or more and 40 parts by mass or less with respect to 100 parts by mass of the base rubber.

The core rubber composition may appropriately contain a weight adjusting agent such as zinc oxide and barium sulfate, an antioxidant, or a colored powder, in addition to the base rubber, the co-crosslinking agent, the crosslinking initiator, and the organic sulfur compound.

[Construction of Golf Ball]

The construction of the golf ball according to the present invention is not particularly limited, as long as the golf ball comprises a spherical core and one or more cover layers covering the spherical core. Examples of the construction of the golf ball include a two-piece golf ball composed of a single-layered spherical core and a single-layered cover covering the spherical core wherein the single-layered cover contains (A) the base resin and (B) the polyrotaxane; a three-piece golf ball composed of a single-layered spherical core, an inner cover layer covering the spherical core and an outer cover layer covering the inner cover layer wherein either or both of the inner cover layer and the outer cover layer contains (A) the base resin and (B) the polyrotaxane; a multi-piece golf ball (e.g. a four-piece golf ball, a five-piece golf ball) composed of a single-layered spherical core, two or more inner cover layers covering the spherical core and an outermost cover layer covering the inner cover layers wherein at least one layer of the two or more inner cover layers contains (A) the base resin and (B) the polyrotaxane; and a multi-piece golf ball (e.g. a four-piece golf ball, a five-piece golf ball) composed of a single-layered spherical core, two or more inner cover layers covering the spherical core and an outermost cover layer covering the inner cover layers wherein the outermost cover layer contains (A) the base resin and (B) the polyrotaxane.

In the multi-piece golf ball (e.g. four-piece golf ball, five-piece golf ball) composed of a single-layered spherical core, two or more inner cover layers covering the spherical core and an outermost cover layer covering the inner cover layers wherein at least one layer of the two or more inner cover layers contains (A) the base resin and (B) the polyrotaxane, the outermost layer of the inner cover layers preferably contains (A) the base resin and (B) the polyrotaxane, and all layers of the inner cover layers may contain (A) the base resin and (B) the polyrotaxane.

In the multi-piece golf ball (e.g. four-piece golf ball, five-piece golf ball) composed of a single-layered spherical core, two or more inner cover layers covering the spherical core and an outermost cover layer covering the inner cover layers wherein the outermost cover layer contains (A) the base resin and (B) the polyrotaxane, at least one layer of the two or more inner cover layers may contain (A) the base resin and (B) the polyrotaxane. In this case, the outermost layer of the inner cover layers preferably contains (A) the base resin and (B) the polyrotaxane, and all layers of the inner cover layers may contain (A) the base resin and (B) the polyrotaxane.

The spherical core of the golf ball according to the present invention preferably has a diameter of 37.0 mm or more, more preferably 37.5 mm or more, and even more preferably 38.0 mm or more, and preferably has a diameter of 42.2 mm or less, more preferably 41.8 mm or less, even more preferably 41.5 mm or less, and most preferably 41.0 mm or less. If the diameter of the spherical core is 37.0 mm or more, the thickness of the cover does not become too thick and thus the resilience becomes better. On the other hand, if the diameter of the spherical core is 42.2 mm or less, the thickness of the cover does not become too thin and thus the cover functions better.

When the spherical core has a diameter in a range from 37.0 mm to 42.2 mm, the compression deformation amount of the spherical core (shrinking amount of the spherical core along the compression direction) when applying a load from 98 N as an initial load to 1275 N as a final load to the spherical core is preferably 2.0 mm or more, more preferably 2.1 mm or more, and even more preferably 2.2 mm or more, and is preferably 5.0 mm or less, more preferably 4.9 mm or less, and even more preferably 4.8 mm or less. If the compression deformation amount is 2.0 mm or more, the shot feeling becomes better, and if the compression deformation amount is 5.0 mm or less, the resilience becomes higher.

The thickness of the cover of the golf ball according to the present invention is preferably 0.5 mm or more, more preferably 0.7 mm or more, and even more preferably 0.9 mm or more, and is preferably 4.0 mm or less, more preferably 3.0 mm or less, and even more preferably 2.0 mm or less. This is because if the thickness of the cover falls within the above range, lowering in the durability or abrasion resistance of the cover can be further suppressed. It is noted that when the cover has a plurality of layers, it is preferred that the total thickness of the cover layers falls within the above range.

In the case that the golf ball according to the present invention has two or more inner cover layers and the outermost cover layer, the total thickness of the inner cover layers is preferably 0.5 mm or more, more preferably 0.6 mm or more, and even more preferably 0.7 mm or more, and is preferably 4.0 mm or less, more preferably 3.5 mm or less, and even more preferably 3.0 mm or less. In addition, the thickness of each layer of the inner cover layers is preferably 0.3 mm or more, more preferably 0.4 mm or more, and even more preferably 0.5 mm or more, and is preferably 2.0 mm or less, more preferably 1.8 mm or less, and even more preferably 1.6 mm or less.

The thickness of the outermost cover layer is preferably 4.0 mm or less, more preferably 3.0 mm or less, and even more preferably 2.0 mm or less, and is preferably 0.3 mm or more, more preferably 0.4 mm or more, and even more preferably 0.5 mm or more. This is because if the thickness of the outermost cover layer falls within the above range, the obtained golf ball has better resilience or shot feeling.

The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimples is small. The shape (shape in a plan view) of the dimples includes, but is not limited to, a circle, a polygonal shape such as a roughly triangular shape, a roughly quadrangular shape, a roughly pentagonal shape and a roughly hexagonal shape, and other irregular shape. The shape of the dimples may be employed solely or at least two of them may be used in combination.

The golf ball according to the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, and particularly preferably 42.80 mm or less. In addition, the golf ball according to the present invention preferably has a mass in a range from 40 g to 50 g. In light of obtaining greater inertia, the mass is more preferably 44 g or more, and particularly preferably 45.00 g or more. In light of satisfying a regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become too hard and thus the shot feeling thereof becomes better. On the other hand, if the compression deformation amount is 5.0 mm or less, the resilience of the golf ball becomes higher.

[Method for Producing Golf Ball]

The spherical core of the golf ball according to the present invention may be molded, for example, by heat pressing the spherical core rubber composition. The molding conditions for heat pressing the core rubber composition may be determined appropriately depending on the rubber formulation. Generally, the heat pressing is preferably carried out at the temperature ranging from 130° C. to 200° C. for 10 to 60 minutes, or carried out in a two-step heating of heating at the temperature ranging from 130° C. to 150° C. for 20 to 40 minutes followed by heating at the temperature ranging from 160° C. to 180° C. for 5 to 15 minutes.

Examples of the method for molding the cover of the golf ball according to the present invention include a method which comprises molding the cover composition into a hollow shell, covering the core with a plurality of the hollow shells and subjecting the core with a plurality of the hollow shells to the compression molding (preferably a method which comprises molding the cover composition into a hollow half shell, covering the spherical core with two of the hollow half shells, and subjecting the spherical core with two of the hollow half shells to the compression molding); and a method which comprises injection molding the cover composition directly onto the spherical core. The cover of the golf ball according to the present invention is preferably molded by the injection molding method. This is because if the injection molding method is adopted, the cover can be produced more easily.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the spherical core with two of the half shells and then subjecting the spherical core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, for example, the hold pin is protruded to hold the core, and the cover composition is charged and cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and cooled for 10 to 60 seconds, and the mold is opened to eject the golf ball.

In case of using an injection molding machine having an extruder and a mold to mold the cover, the temperature at the cylinder (barrel) portion of the extruder (setting temperature of the extruder) is preferably 200° C. or more, more preferably 210° C. or more, and is preferably 270° C. or less, more preferably 260° C. or less. If the temperature at the cylinder (barrel) portion falls within the above range, the fluidity of the cover composition can be maintained.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, and even more preferably 30 μm or less. This is because if the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

Figure 2:
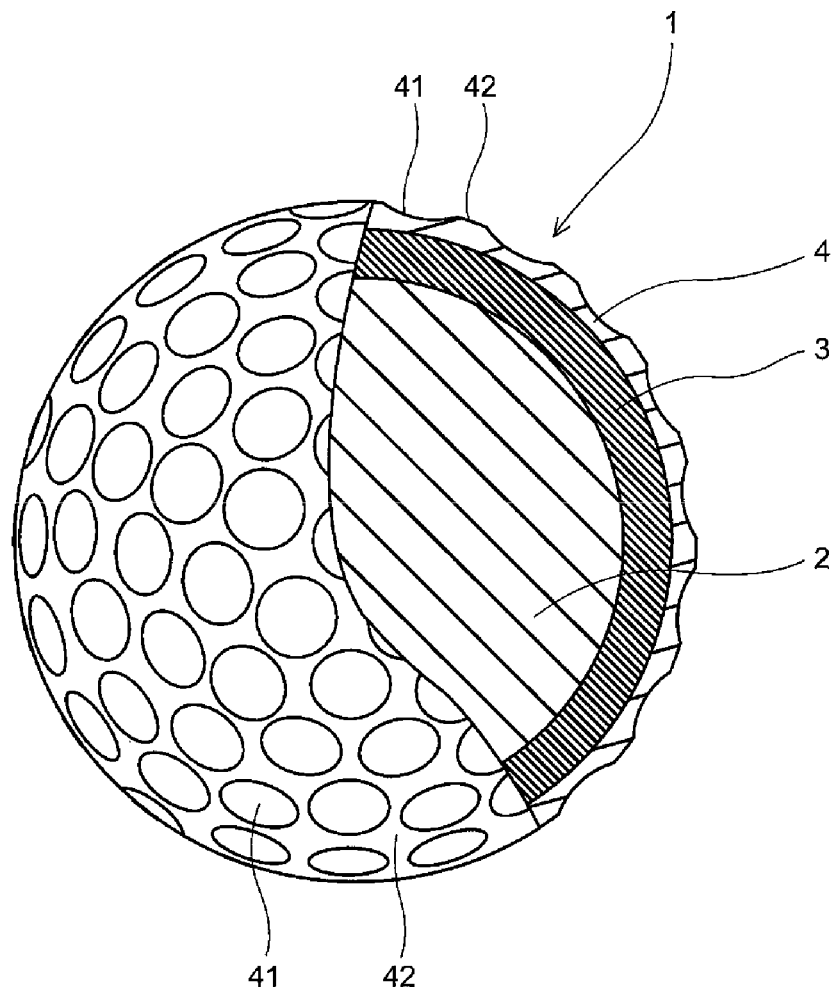
FIG. 2 is a partially cutaway sectional view showing a golf ball according to an embodiment of the present invention.

FIG. 2 is a partially cutaway sectional view showing a golf ball 1 according to an embodiment of the present invention. The golf ball 1 comprises a spherical core 2, an inner cover layer 3 disposed outside the spherical core 2, and an outer cover layer 4 disposed outside the inner cover layer 3. A plurality of dimples 41 are formed on the surface of the outer cover layer 4. Other portion than the dimples 41 on the surface of the outer cover layer 4 is lands 42. In a preferable embodiment of the present invention, the outer cover layer 4, the inner cover layer 3, or both of the outer cover layer 4 and the inner cover layer 3 contains (A) the base resin and (B) the polyrotaxane.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]
(1) Compression Deformation Amount (mm)

The deformation amount of the core along the compression direction (shrinking amount of the core along the compression direction), when applying a load from an initial load of 98 N to a final load of 1275 N to the core, was measured.

(2) Material Hardness (Shore D Hardness)

Sheets with a thickness of about 2 mm were produced by injection molding (cylinder temperature: 230° C.) the base resin or the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D". It is noted that when measuring the material hardness of the cover composition, a composition obtained by blending predetermined materials ((B) the polyrotaxane, titanium dioxide and so on) into (A) the base resin is used for the measurement.

(3) Shot Feeling

An actual hitting test was carried out by using a driver by ten amateur golfers (high skilled persons). In accordance with the following grading standard, the feeling of each golfer at hitting the golf ball was evaluated. The shot feeling most evaluated by the ten golfers was adopted as the shot feeling of that golf ball.

Grading standard
G(Good): Impact is low and feeling is good.
F(Fair): Impact is normal.
P(Poor): Impact is great and feeling is bad.

(4) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, the coefficient of restitution of each golf ball was calculated. The measurement was conducted using twelve samples for each golf ball, and the average value thereof was adopted as the coefficient of restitution for that golf ball. It is noted that the coefficient of restitution of the golf ball No. 1 was defined as 100, and the coefficient of restitution of each golf ball was represented by converting the coefficient of restitution of each golf ball into this index.

(5) Durability

A test was carried out by using an air gun to make each golf ball collide with a metal plate at a speed of 45 m/sec for 100 times. Twelve samples for each golf ball were used in the test. The durability of each golf ball was evaluated as follows: the durability of the golf ball was evaluated as "G(Good)" if no damage occurred in all of the twelve golf balls, and the durability of the golf ball was evaluated as "P(Poor)" if damage occurred in some of the twelve golf balls.

(6) Abrasion Resistance

A commercially available sandwedge (XXIO 3 available from Dunlop Sports Limited) was installed on a swing robot available from Golf Laboratories, Inc., and each golf ball was hit at a head speed of 36 m/sec. Each hit portion was observed, and the abrasion resistance was evaluated according to the following three-level grading standard.

Grading standard
G (Good): Almost no damage occurred on the surface of the golf ball.
F (Fair): The surface of the golf ball slightly abraded and fluff occurred thereon.
P (Poor): The surface of the golf ball greatly abraded and remarkably fluffed.

[Production of Golf Ball]
(1) Production of Spherical Core

The rubber compositions having the formulations shown in Table 1 were kneaded, and heat pressed in upper and lower molds, each having a hemispherical cavity, to produce spherical cores. It is noted that barium sulfate was appropriately added such that the obtained golf ball had a mass of 45.6 g.

TABLE 1

| Rubber composition No. | | A | B | C | D |
|---|---|---|---|---|---|
| Formulation (parts by mass) | Polybutadiene rubber | 100 | 100 | 100 | 100 |
| | Zinc acrylate | 27.5 | 27.5 | 31 | 32 |
| | Zinc oxide | 5 | 10 | 5 | 5 |
| | Barium sulfate | Appropriate amount* | Appropriate amount* | Appropriate amount* | Appropriate amount* |
| | Dicumyl peroxide | 0.9 | 0.9 | 0.7 | 0.9 |
| | PBDS | — | 0.4 | — | — |
| | 2-Thionaphthol | 0.1 | 0.1 | — | 0.1 |
| | Diphenyldisulfide | — | — | 0.5 | 0.5 |
| | Zinc caprylate | 2 | — | — | — |
| | Benzoic acid | — | 2 | — | — |

TABLE 1-continued

| Rubber composition No. | | A | B | C | D |
|---|---|---|---|---|---|
| Molding condition | Molding temperature (° C.) | 160 | 160 | 170 | 170 |
| | Molding time (min) | 20 | 20 | 15 | 20 |
| Core diameter (mm) | | 39.4 | 39.4 | 38.2 | 39.8 |
| Compression deformation amount (mm) | | 3.9 | 4.2 | 3.4 | 3.6 |

*As to the amount of barium sulfate, adjustment was made such that the golf ball had a mass of 45.6 g.

Polybutadiene rubber: "BR730 (high-cis polybutadiene)" available from JSR Corporation Zinc acrylate: "ZNDA-90S" available from Nisshoku Techno Fine Chemical Co., Ltd.

Zinc oxide: "Ginrei (registered trademark) R" available from Toho Zinc Co., Ltd.

Barium sulfate: "Barium Sulfate BD" available from Sakai Chemical Industry Co., Ltd.

Dicumyl peroxide: "PERCUMYL (registered trademark) D" available from NOF Corporation PBDS: bis(pentabromophenyl) disulfide available from Kawaguchi Chemical Industry Co., Ltd.

2-Thionaphthol: available from Tokyo Chemical Industry Co., Ltd.

Diphenyldisulfide: available from Sumitomo Seika Chemicals Co., Ltd.

Zinc caprylate: available from Mitsuwa Chemicals Co., Ltd.

Benzoic acid: available from Tokyo Chemical Industry Co., Ltd.

(2) Production of Cover Layer (2-1) Production of Inner Cover Layer of Golf Balls No. 1 to 12

The inner cover layer compositions were prepared by kneading the materials having the formulations shown in Table 2 with a kneader. The obtained inner cover layer composition was charged one by one into each of the depressed part of the lower mold of the mold for molding half shells, and a pressure was applied to mold the half shells. The compression molding was conducted under the conditions of a molding temperature of 170° C., a molding time of 5 minutes and a molding pressure of 2.94 MPa. The spherical core obtained in the step (1) was concentrically covered with two of the obtained half shells, and then subjected to compression molding to form the inner cover layer. The compression molding was conducted under the conditions of a molding temperature of 170° C. and a molding time of 15 minutes.

TABLE 2

| | | | | Golf ball No. | | | | | | | |
|---|---|---|---|---|---|---|---|---|---|---|---|
| | | | | 1 | 2 | 3 | 4 | 5 | 6 | 7 | 8 |
| Spherical core | Rubber composition No. | | | A | A | A | A | B | B | B | B |
| | Diameter (mm) | | | 39.4 | 39.4 | 39.4 | 39.4 | 39.4 | 39.4 | 39.4 | 39.4 |
| Inner cover layer | Formulation: parts by mass | (A) Base resin | Himilan AM7327 | — | 14 | — | — | — | 100 | — | — |
| | | | Himilan 1702 | — | — | — | — | 45 | — | 36 | 45 |
| | | | Himilan 1557 | 42.5 | 28.5 | 40.5 | 42.5 | — | — | — | — |
| | | | Himilan 1555 | 42.5 | 42.5 | 40.5 | 42.5 | 46 | — | 36 | 46 |
| | | | Rabalon T3221C | 15 | 15 | 19 | 15 | 9 | — | 28 | 9 |
| | | (B) | Polyrotaxane | — | — | — | 3 | — | — | — | 13 |
| | | — | Titanium oxide | 4 | 4 | 4 | 4 | 4 | 4 | 4 | 4 |
| | Thickness (mm) | | | 0.8 | 0.8 | 0.8 | 0.8 | 0.8 | 0.8 | 0.8 | 0.8 |
| | Material hardness of (A) base resin (Shore D) | | | 52 | 50 | 50 | 52 | 55 | 44 | 45 | 55 |
| | Material hardness of inner cover layer (Shore D) | | | 52 | 50 | 50 | 50 | 55 | 44 | 45 | 45 |
| Outer cover layer | Formulation: parts by mass | (A) Base resin | Himilan AM7327 | — | — | — | — | — | — | — | — |
| | | | Himilan 1557 | — | — | — | — | — | — | — | — |
| | | | Himilan 1555 | 10 | 10 | 10 | 10 | 10 | 10 | 10 | 10 |
| | | | Himilan AM7337 | 5 | 5 | 5 | 5 | 5 | 5 | 5 | 5 |
| | | | Himilan AM7329 | 55 | 55 | 55 | 55 | 55 | 55 | 55 | 55 |
| | | | Rabalon T3221C | — | — | — | — | — | — | — | — |
| | | | NUCREL N1050H | 30 | 30 | 30 | 30 | 30 | 30 | 30 | 30 |
| | | (B) | Polyrotaxane | — | — | — | — | — | — | — | — |
| | | — | Titanium oxide | 3 | 3 | 3 | 3 | 3 | 3 | 3 | 3 |
| | | | JF-90 | 0.2 | 0.2 | 0.2 | 0.2 | 0.2 | 0.2 | 0.2 | 0.2 |
| | Thickness (mm) | | | 0.85 | 0.85 | 0.85 | 0.85 | 0.85 | 0.85 | 0.85 | 0.85 |
| | Material hardness of (A) base resin (Shore D) | | | 61 | 61 | 61 | 61 | 61 | 61 | 61 | 61 |
| | Material hardness of outer cover layer (Shore D) | | | 61 | 61 | 61 | 61 | 61 | 61 | 61 | 61 |
| Ball property | Shot feeling | | | F | G | G | G | F | G | G | G |
| | Coefficient of restitution | | | 100 | 99 | 100 | 100 | 100 | 97 | 100 | 100 |
| | Durability | | | G | G | P | G | G | G | P | G |
| | Abrasion resistance | | | G | G | G | G | G | G | G | G |

TABLE 2-continued

| | | | Golf ball No. | | | | | | | |
|---|---|---|---|---|---|---|---|---|---|---|
| | | | 9 | 10 | 11 | 12 | 13 | 14 | 15 | 16 |
| Spherical core | Rubber composition No. | | C | C | C | C | D | D | D | D |
| | Diameter (mm) | | 38.2 | 38.2 | 38.2 | 38.2 | 39.8 | 39.8 | 39.8 | 39.8 |
| Inner cover layer | Formulation: (A) parts by mass Base resin | Himilan AM7327 | — | — | — | — | — | — | — | — |
| | | Himilan 1702 | — | — | — | — | — | — | — | — |
| | | Himilan 1557 | 49 | 49 | 49 | 49 | — | — | — | — |
| | | Himilan 1555 | 49 | 49 | 49 | 49 | — | — | — | — |
| | | Rabalon T3221C | 2 | 2 | 2 | 2 | — | — | — | — |
| | (B) | Polyrotaxane | — | — | — | — | — | — | — | — |
| | — | Titanium oxide | 4 | 4 | 4 | 4 | — | — | — | — |
| | Thickness (mm) | | 1.0 | 1.0 | 1.0 | 1.0 | — | — | — | — |
| | Material hardness of (A) base resin (Shore D) | | 60 | 60 | 60 | 60 | — | — | — | — |
| | Material hardness of inner cover layer (Shore D) | | 60 | 60 | 60 | 60 | — | — | — | — |
| Outer cover layer | Formulation: (A) parts by mass Base resin | Himilan AM7327 | — | 16 | — | — | — | 16 | — | — |
| | | Himilan 1557 | 48 | 32 | 44 | 48 | 48 | 32 | 44 | 48 |
| | | Himilan 1555 | 48 | 48 | 44 | 48 | 48 | 48 | 44 | 48 |
| | | Himilan AM7337 | — | — | — | — | — | — | — | — |
| | | Himilan AM7329 | — | — | — | — | — | — | — | — |
| | | Rabalon T3221C | 4 | 4 | 8 | 4 | 4 | 4 | 8 | 4 |
| | | NUCREL N1050H | — | — | — | — | — | — | — | — |
| | (B) | Polyrotaxane | — | — | — | 3 | — | — | — | 3 |
| | — | Titanium oxide | 4 | 4 | 4 | 4 | 4 | 4 | 4 | 4 |
| | | JF-90 | — | — | — | — | — | — | — | — |
| | Thickness (mm) | | 1.25 | 1.25 | 1.25 | 1.25 | 1.45 | 1.45 | 1.45 | 1.45 |
| | Material hardness of (A) base resin (Shore D) | | 58 | 56 | 56 | 58 | 58 | 56 | 56 | 58 |
| | Material hardness of outer cover layer (Shore D) | | 58 | 56 | 56 | 56 | 58 | 56 | 56 | 56 |
| Ball property | Shot feeling | | P | F | F | G | P | F | F | G |
| | Coefficient of restitution | | 101 | 100 | 101 | 101 | 101 | 100 | 101 | 101 |
| | Durability | | G | G | G | G | G | G | G | G |
| | Abrasion resistance | | G | G | F | G | G | G | F | G |

Himilan AM7327: Zinc ion-neutralized ethylene-methacrylic acid-butyl acrylate ternary copolymer ionomer resin (melt flow rate (190° C., 2.16 kgf): 3 g/10 min, bending stiffness: 35 MPa, material hardness: 44 (Shore D)) available from Du Pont-Mitsui Polychemicals Co., Ltd.

Himilan 1702: Zinc ion-neutralized ethylene-methacrylic acid binary copolymer ionomer resin (melt flow rate (190° C., 2.16 kgf): 16 g/10 min, bending stiffness: 150 MPa, material hardness: 60 (Shore D)) available from Du Pont-Mitsui Polychemicals Co., Ltd.

Himilan 1557: Zinc ion-neutralized ethylene-methacrylic acid binary copolymer ionomer resin (melt flow rate (190° C., 2.16 kgf): 5 g/10 min, bending stiffness: 215 MPa, material hardness: 61 (Shore D)) available from Du Pont-Mitsui Polychemicals Co., Ltd.

Himilan 1555: sodium ion-neutralized ethylene-methacrylic acid binary copolymer ionomer resin (melt flow rate (190° C., 2.16 kgf): 10 g/10 min, bending stiffness: 205 MPa, material hardness: 60 (Shore D)) available from Du Pont-Mitsui Polychemicals Co., Ltd.

Himilan AM7337: sodium ion-neutralized ethylene-methacrylic acid binary copolymer ionomer resin (melt flow rate (190° C., 2.16 kgf): 4 g/10 min, bending stiffness: 272 MPa, material hardness: 65 (Shore D)) available from Du Pont-Mitsui Polychemicals Co., Ltd.

Himilan AM7329: Zinc ion-neutralized ethylene-methacrylic acid binary copolymer ionomer resin (melt flow rate (190° C., 2.16 kgf): 5 g/10 min, bending stiffness: 221 MPa, material hardness: 64 (Shore D)) available from Du Pont-Mitsui Polychemicals Co., Ltd.

Rabalon T3221C: styrene thermoplastic elastomer available from Mitsubishi Chemical Corporation NUCREL N1050H: ethylene-methacrylic acid copolymer available from Du Pont-Mitsui Polychemicals Co., Ltd.

Polyrotaxane: "SeRM (registered trademark) super polymer SH2400P (a polyrotaxane having a cyclodextrin with at least a part of hydroxyl groups thereof being modified with a caprolactone chain via —O—$C_3H_6$—O— group, polyethylene glycol as a linear molecule, and an adamantyl group as a blocking group wherein the linear molecule has a molecular weight of 20,000, and the polyrotaxane has a hydroxyl value of 76 mg KOH/g and a total molecular weight of 400,000 in a weight average molecular weight)" available from Advanced Softmaterials Inc.

Titanium oxide: "A220" available from Ishihara Sangyo Kaisha, Ltd.

JF-90: bis(2,2,6,6-tetramethyl-4-piperidyl) sebacate available from Johoku Chemical Co. Ltd.

(2-2) Production of Outer Cover Layer of Golf Balls No. 1 to 16

The outer cover layer compositions in a pellet form were prepared respectively by mixing the materials having the formulations shown in Table 2 with a twin-screw kneading extruder. The extruding conditions for the outer cover layer compositions were a screw diameter of 45 mm, a screw rotational speed of 200 rpm and screw L/D=35, and the mixture was heated to 160° C. to 230° C. at the die position of the extruder.

When molding the outer cover layer, the hold pin was protruded to hold the spherical body having the inner cover layer formed thereon, the outer cover layer composition heated to 260° C. was charged for 0.3 second into a mold held under a pressure of 80 tons, and cooled for 30 seconds, and the mold was opened to eject the golf ball. The surface of the obtained golf ball body was treated with sandblast and marked. A clear paint was applied, and dried in an oven at 40° C. to obtain the golf ball having a diameter of 42.7 mm and a mass of 45.6 g. For the golf balls No. 13 to No. 16, no inner cover layer was formed, the outer cover layer composition was injection molded directly onto the spherical core to produce the outer cover layer.

Evaluation results regarding the obtained golf balls are shown in Table 2. The golf balls No. 4, 8, 12 and 16 are the golf balls comprising a spherical core and one or more cover layers disposed outside the spherical core wherein at least one layer of the cover layers contains: (A) a base resin containing (a-1) an ionomer resin and having a material hardness of 58 or less in Shore D hardness; and (B) a polyrotaxane having a cyclodextrin with at least a part of hydroxyl groups thereof being modified with a caprolactone chain via —O—$C_3H_6$—O— group, a linear molecule piercing through a cyclic structure of the cyclodextrin, and blocking groups located at both terminals of the linear molecule to prevent disassociation of the cyclodextrin. It is apparent from Table 2 that the golf balls No. 4, 8, 12 and 16 have excellent shot feeling and resilience as well as improved durability and abrasion resistance.

The golf ball according to the present invention has excellent shot feeling and resilience as well as improved durability and abrasion resistance.

This application is based on Japanese Patent Application No. 2016-253567 filed on Dec. 27, 2016, the content of which is hereby incorporated by reference.

The invention claimed is:

1. A golf ball comprising a spherical core and one or more cover layers disposed outside the spherical core, wherein at least one layer of the cover layers contains:
   (A) a base resin containing (a-1) an ionomer resin and having a material hardness of 58 or less in Shore D hardness; and
   (B) a polyrotaxane having a cyclodextrin with at least a part of hydroxyl groups of the cyclodextrin being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin.

2. The golf ball according to claim 1, wherein (A) the base resin further contains (a-2) a non-ionomer resin.

3. The golf ball according to claim 1, wherein (B) the polyrotaxane has polyethylene glycol as the linear molecule and an adamantyl group as the blocking group.

4. The golf ball according to claim 1, wherein the cover layer containing (A) the base resin and (B) the polyrotaxane contains (B) the polyrotaxane in an amount of from 0.1 part by mass to 20 parts by mass with respect to 100 parts by mass of (A) the base resin.

5. The golf ball according to claim 1, wherein the cover layer containing (A) the base resin and (B) the polyrotaxane has a material hardness of from 40 to 58 in Shore D hardness.

6. The golf ball according to claim 1, wherein (A) the base resin contains (a-1) the ionomer resin in an amount of 50 mass % or more.

7. The golf ball according to claim 2, wherein (A) the base resin contains (a-2) the non-ionomer resin in an amount of from 1 mass % to 50 mass %.

8. The golf ball according to claim 2, wherein a mass ratio ((a-2)/(a-1)) of (a-2) the non-ionomer resin to (a-1) the ionomer resin in (A) the base resin ranges from 1/99 to 50/50.

9. The golf ball according to claim 2, wherein (a-2) the non-ionomer resin is at least one member selected from the group consisting of a polyamide, a styrene elastomer, a polyolefin elastomer, a polyamide elastomer, a polyester elastomer, a binary copolymer composed of an olefin and an $\alpha,\beta$-unsaturated carboxylic acid having 3 to 8 carbon atoms, and a ternary copolymer composed of an olefin, an $\alpha,\beta$-unsaturated carboxylic acid having 3 to 8 carbon atoms and an $\alpha,\beta$-unsaturated carboxylic acid ester.

10. The golf ball according to claim 1, wherein a total ratio of (A) the base resin and (B) the polyrotaxane to all the resin components in the cover layer containing (A) the base resin and (B) the polyrotaxane is 60 mass % or more.

11. The golf ball according to claim 1, wherein (a-1) the ionomer resin is at least one member selected from the group consisting of an ionomer resin consisting of a metal ion-neutralized product of a binary copolymer composed of an olefin and an $\alpha,\beta$-unsaturated carboxylic acid having 3 to 8 carbon atoms; and an ionomer resin consisting of a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester.

12. The golf ball according to claim 1, wherein (A) the base resin has the material hardness of 42 or more in Shore D hardness.

13. The golf ball according to claim 1, wherein (B) the polyrotaxane has a total molecular weight of from 30,000 to 3,000,000 in a weight average molecular weight.

14. A golf ball comprising a spherical core and one or more cover layers disposed outside the spherical core, wherein at least one layer of the cover layers contains:
   (A) a base resin having a material hardness of 58 or less in Shore D hardness and containing (a-1) an ionomer resin and (a-2) a non-ionomer resin in a mass ratio ((a-2)/(a-1)) of (a-2) the non-ionomer resin to (a-1) the ionomer resin ranging from 1/99 to 50/50; and
   (B) a polyrotaxane having a cyclodextrin with at least a part of hydroxyl groups of the cyclodextrin being modified with a caprolactone chain having a carboxyl group at a terminal of the caprolactone chain, a linear molecule piercing through a cyclic structure of the cyclodextrin, and blocking groups located at both terminals of the linear molecule to prevent disassociation of the cyclodextrin, and
   wherein the cover layer containing (A) the base resin and (B) the polyrotaxane contains (B) the polyrotaxane in an amount of from 0.1 part by mass to 20 parts by mass with respect to 100 parts by mass of (A) the base resin.

15. The golf ball according to claim 14, wherein (a-2) the non-ionomer resin is at least one member selected from the group consisting of a polyamide, a styrene elastomer, a polyolefin elastomer, a polyamide elastomer, a polyester elastomer, a binary copolymer composed of an olefin and an $\alpha,\beta$-unsaturated carboxylic acid having 3 to 8 carbon atoms, and a ternary copolymer composed of an olefin, an $\alpha,\beta$-unsaturated carboxylic acid having 3 to 8 carbon atoms and an $\alpha,\beta$-unsaturated carboxylic acid ester.

16. The golf ball according to claim 15, wherein (B) the polyrotaxane has a total molecular weight of from 30,000 to 3,000,000 in a weight average molecular weight.

17. The golf ball according to claim 16, wherein (B) the polyrotaxane has polyethylene glycol as the linear molecule and an adamantyl group as the blocking group.

* * * * *